US008847093B2

(12) United States Patent
Xie et al.

(10) Patent No.: US 8,847,093 B2
(45) Date of Patent: Sep. 30, 2014

(54) TOUCH SENSING DEVICE AND MANUFACTURING METHOD THEREOF

(75) Inventors: Yanjun Xie, Wuhan (CN); Yau-Chen Jang, Zhubei (TW); Limei Huang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 182 days.

(21) Appl. No.: 13/552,663

(22) Filed: Jul. 19, 2012

(65) Prior Publication Data
US 2013/0098749 A1    Apr. 25, 2013

(30) Foreign Application Priority Data

Oct. 23, 2011  (CN) .......................... 2011 1 0341872

(51) Int. Cl.
*H03K 17/975* (2006.01)
*G06F 3/044* (2006.01)
(52) U.S. Cl.
CPC ...... *G06F 3/044* (2013.01); *G06F 2203/04103* (2013.01)
USPC ......................... 200/600; 345/173

(58) Field of Classification Search
USPC ................. 200/600; 178/18.01, 18.05, 18.06, 178/18.07; 345/173; 341/33, 34
See application file for complete search history.

(56) References Cited

U.S. PATENT DOCUMENTS

2010/0007616 A1* 1/2010 Jang ............................. 345/173
2011/0005818 A1* 1/2011 Lee et al. ...................... 174/258

FOREIGN PATENT DOCUMENTS

CN        101706702 A        11/2009
TW        201040818          11/2010

\* cited by examiner

*Primary Examiner* — Vanessa Girardi
(74) *Attorney, Agent, or Firm* — Gokalp Bayramoglu

(57) ABSTRACT

The present disclosure relates to a touch sensing device comprising a plurality of sensing electrode units and an insulating pattern layer. The insulating pattern layer covers the plurality of sensing electrode units and has a plurality of openings that are not corresponding to plurality of sensing electrode units. The present disclosure also discloses a method for manufacturing the touch sensing device.

26 Claims, 5 Drawing Sheets

TOUCH SENSING DEVICE AND MANUFACTURING METHOD THEREOF

This application claims the benefit of Chinese application No. 201110341872.0 filed on Oct. 23, 2011.

BACKGROUND

1. Field of the Invention

The present disclosure relates to an input interface and more particularly to a touch sensing device and a method for manufacturing the same.

2. Description of the Related Art

With an increase in demand of operational convenience, more and more electronic products employ touch panels having a touch sensing device, which enable users to execute an input function by fingers or stylus so as to finish information transmission.

The touch sensing device in the touch panel is usually formed by sensing electrode arrays. In the manufacturing process of the touch sensing device, the sensing electrode arrays are generally baked once after manufacturing steps are completed. However, when the sensing electrode arrays are baked in the presence of oxygen, sheet resistance increases with rising temperature. Once the resistance exceeds a particular threshold, positions of touch points recognized by control circuit (not shown) are affected, thereby reducing the sensitivity of the touch sensing device.

Therefore, it is necessary to seek a novel and improved touch sensing device, which avoids the foregoing problems.

SUMMARY OF THE INVENTION

An object of the embodiments of the present disclosure is to resolve the foregoing problems in touch sensing devices. The present disclosure utilizes a protective structure to cover all sensing electrodes, so as to isolate oxygen during the period of high-temperature baking, and to avoid the resistance of the sensing electrodes from changing or reducing the changes therein, thereby enhancing or maintaining sensitivity of the touch sensing device.

According to one embodiment of the present disclosure a touch sensing device comprises: a plurality of sensing electrode units, and an insulating pattern layer that covers the plurality of sensing electrode units and has a plurality of openings that are not corresponding to the sensing electrode units.

According to one embodiment of the present disclosure a manufacturing method of a touch sensing device comprises: forming a plurality of sensing electrode units and forming an insulating pattern layer to cover the plurality of sensing electrode units, wherein the insulating pattern layer has a plurality of openings that are not corresponding to the sensing electrode units.

An advantage of the present disclosure is that the touch sensing device provides a protective structure, which prevents or reduces resistance change of the sensing electrodes that occur during the manufacturing, thereby enhancing or maintaining sensitivity of the touch sensing device. Furthermore, another advantage of the embodiment of the present disclosure is that it is possible to complete the manufacture of the protective structure without adding extra manufacturing process.

DETAILED DESCRIPTION OF THE EMBODIMENTS

A touch sensing device, according to one embodiment of the present disclosure is described below. However, it can be easily understood that the embodiment provided by the present disclosure is only for describing specific manufacturing and using method of the present disclosure, and is not intended to limit the scope of the present disclosure.

Figure 1A:
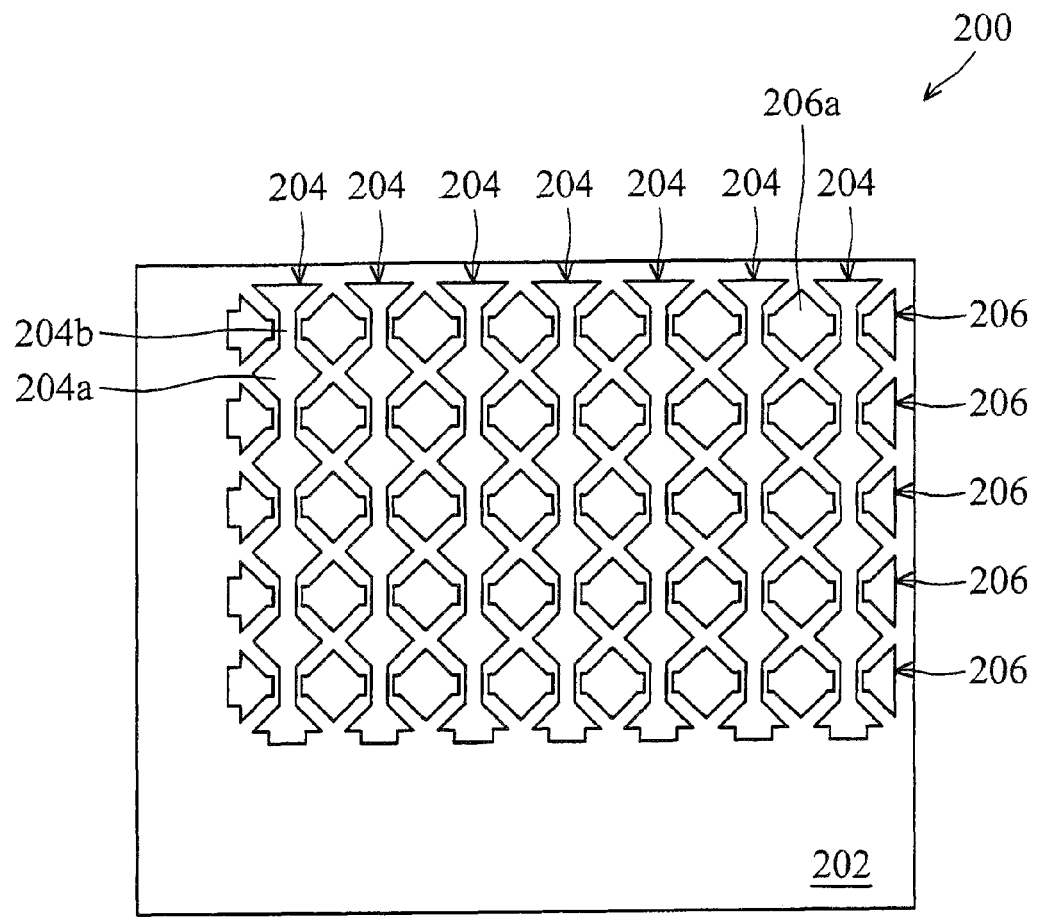
FIG. 1A to 1C is a planar diagram of a manufacturing method of a touch sensing device in accordance with an embodiment of the present disclosure.
Figure 1B:
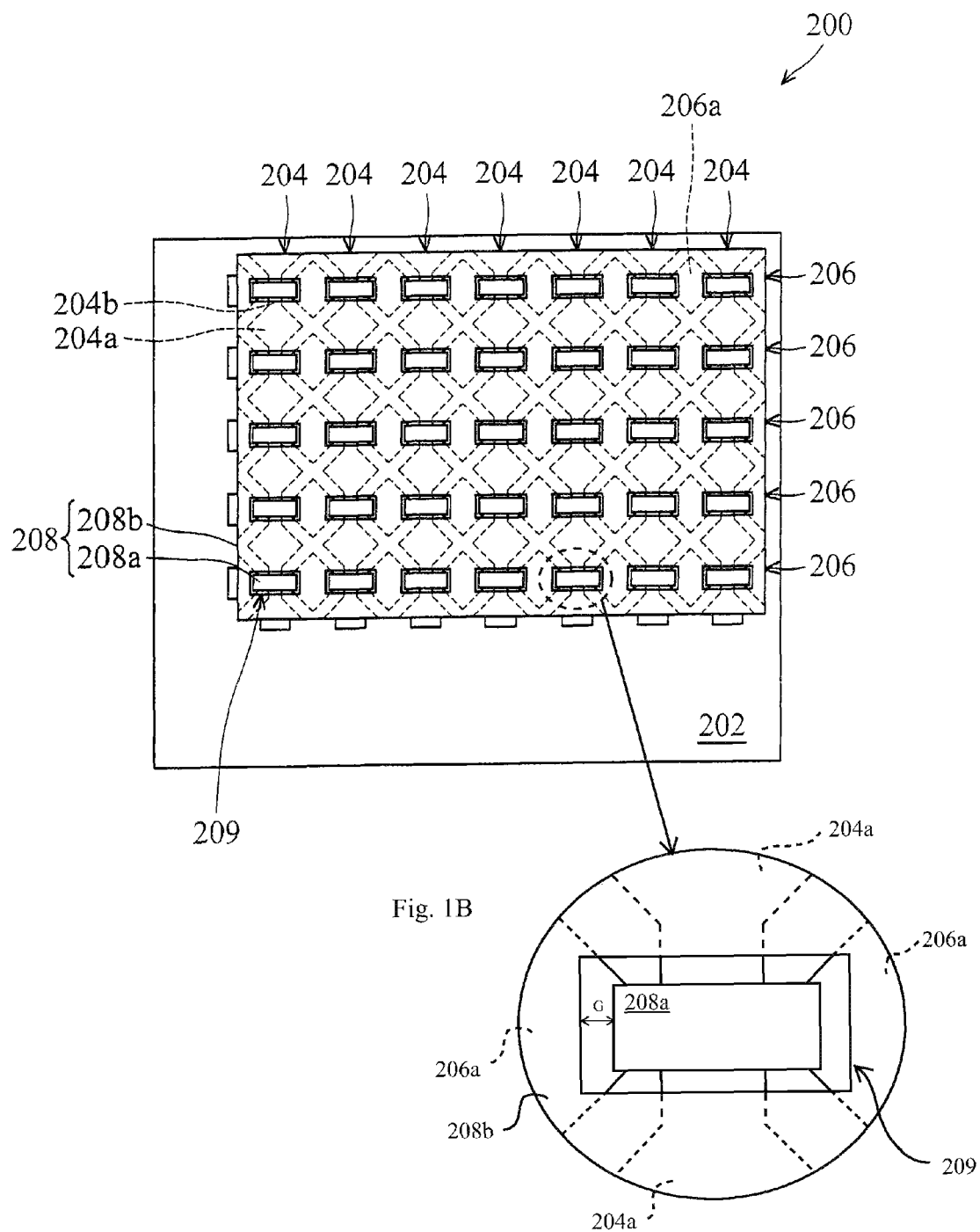
Figure 1C:
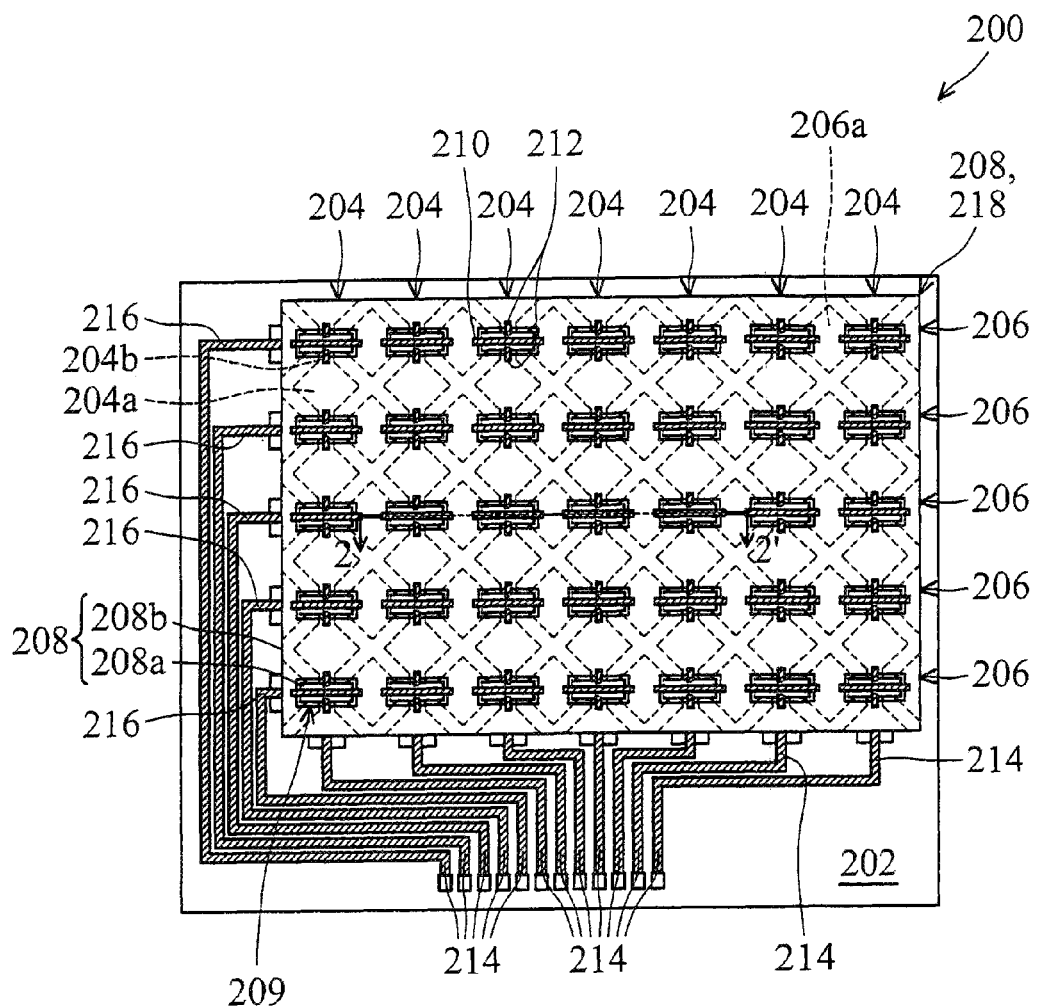
Figure 2:
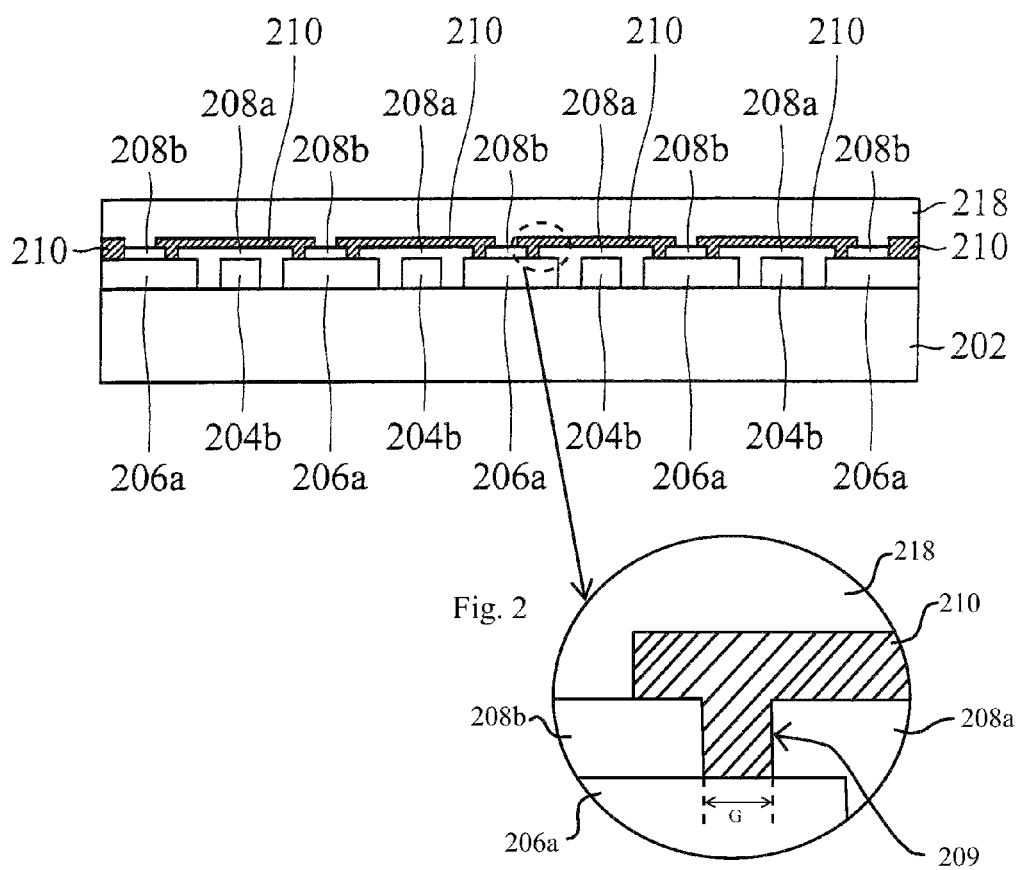
FIG. 2 is a section view diagram of FIG. 1C along 2-2' line.

With reference to FIG. 1C and FIG. 2, FIG. 1C is a planar diagram of a touch sensing device in accordance with an embodiment of the present disclosure, and FIG. 2 is a section view diagram of FIG. 1C along 2-2' line. Touch sensing device 200, such as a capacitive touch sensing device, comprises: a plurality of sensing electrode units and an insulating pattern layer 208b, wherein the insulating pattern layer 208b covers the plurality of sensing electrode units and has a plurality of openings 209 that are not corresponding to the sensing electrode units.

Further, the touch sensing device 200 comprises a substrate 202 on which the sensing electrode units are disposed. The substrate 202 can be used as an upper cover for providing a touch surface for users to directly touch with fingers, stylus, or known techniques. In an embodiment of the present disclosure, the substrate 202 can comprise of transparent materials such as glass, quartz, or other elastic transparent materials. In another embodiment of the present disclosure, the substrate may also comprise inelastic high polymer transparent materials.

Furthermore, as shown in FIG. 1A, the sensing electrode unit may comprise: a plurality of first sensing electrode units 204a and a plurality of second sensing electrode units 206a. The first sensing electrode units 204a are aligned along a first direction and connected to each other through a plurality of connecting parts 204b to form a plurality of first sensing electrode arrays 204, wherein each connecting part 204b is formed by the adjacent first sensing electrode units 204a that have been extended. The second sensing electrode units 206a are aligned along a second direction and connected to each other through a plurality of connecting lines 210 (shown in FIG. 1C and FIG. 2) to form a plurality of second sensing electrode arrays 206.

In an embodiment of the present disclosure, the first sensing electrode arrays 204 and the second sensing electrode arrays 206 are disposed on a non-touch surface of the substrate (corresponding to the touch surface). In an embodiment, the first direction is paralleled to the vertical direction of FIG. 1C, and the second direction is paralleled to the horizontal direction of FIG. 1C, so that each of the first sensing electrode arrays 204 is perpendicular to each of the second sensing electrode arrays 206.

In an embodiment of the present disclosure, the first sensing electrode units 204a, the connecting parts 204b and the second sensing electrode units 206a can be formed by same transparent conductive layer. In this way, the first sensing electrode arrays 204 and the second sensing electrode arrays 206 are formed on same surface so that the display colors are relatively uniform and it is not easy to produce color difference. In an embodiment the first sensing electrode arrays 204 and the second sensing electrode arrays 206 in the present embodiment are aligned on the same surface along different directions and have single layer of configuration structure with double axes (not shown). In other embodiment of the present disclosure, the first sensing electrode arrays 204 and the second sensing electrode arrays 206 can also be aligned on the same surface along a same direction and have single layer of configuration structure with a single axis or can be aligned on different surfaces along different directions and have double layers of configuration structure with double axes (not shown).

With reference to FIG. 1C and FIG. 2, in one embodiment of the present disclosure, each of the first sensing electrode arrays 204 further comprises: a plurality of pairs of connecting points 212 correspondingly disposed on the two corresponding sides of each connecting line 210 and electrically connected to the corresponding connecting parts 204b. Furthermore, the connecting lines 210 and the connecting points 212 can be formed by a same conductive layer (not shown).

Also, since area of the first sensing electrode unit 204a is larger than that of the connecting part 204b, junction of them would form a neck area to raise resistance of the junction. However, in the present disclosure, the connecting point 212, which is made of metal, has a higher electrical conductivity than the connecting part 204b. Therefore, the connecting point 212 formed on the connecting part 204b contributes to reduction in the resistance of neck area, so as to avoid signal attenuation through each first sensing electrode array 204.

In another embodiment of the present disclosure, the touch sensing device 200 further comprises a plurality of insulating bays 208a correspondingly disposed between each connecting part 204b and each connecting line 210. The insulating bays 208a can be stripe shaped and paralleled to the connecting lines 210 for electrically isolating first sensing electrode units 204a and second sensing electrode units 206a. In another embodiment, the insulating bays 208a can be of rectangular, square or other applicable shapes. Furthermore, the insulating bays 208a and an insulating pattern layer 208b form a protective structure 208, wherein the insulating pattern layer 208b covers the first sensing electrode units 204a, the second sensing electrode units 206a, and part of the connecting parts 204b. Furthermore, openings 209 of the insulating pattern layer 208b correspond to the position of the insulating bays 208a to make the insulating pattern layer 208b surround each insulating bay 208a though each opening 209. In this way, the protective structure 208 may isolate the oxygen during the period of high-temperature baking in the manufacturing process of the touch sensing device 200, so as to avoid resistances of the first sensing electrode units 204a and the second sensing electrode units 206a from changing or reducing the changes thereof. In one embodiment of the present disclosure, the insulating bays 208a and the insulating pattern layer 208b may be formed by a same insulating layer.

In one embodiment of the present disclosure, the openings 209 that surround the insulating bays 208a reveal a part of the second electrode units 206a and a part of the connecting parts 204b. Connecting points 212 can be located in a gap between the insulating bays 208a and the insulating pattern layer 208b so that, the connecting lines 210 are electrically connected or contacted with the revealed second sensing electrode units 206a through the openings 209. Furthermore, the connecting points 212 can be electrically connected or contacted with the corresponding connecting parts 204b through the openings 209.

In another embodiment of the present disclosure, the touch sensing device 200 further comprises: a plurality of first wires 214 and a plurality of second wires 216. The first wires 214 are correspondingly connected to the first sensing electrode arrays 204, and the second wires 216 are correspondingly connected to the second sensing electrode arrays 206. The first and second wires 214 and 216 may be formed by a same conductive layer; as well as the forming of the connecting lines 210 and the connecting points 212. Furthermore, the first and second wires 214 and 216 are used as input or output terminals for exterior circuit (not shown).

In another embodiment of the present disclosure, the touch sensing device 200 further comprises an insulating layer 218, which covers the protective structure 208 (namely, the insulating bays 208a and the insulating pattern layer 208b), the connecting lines 210, and the connecting points 212. The insulating layer 218 is used for protecting the first sensing electrode arrays 204 and the second sensing electrode arrays 206, and avoiding the oxidation and damages that can be caused by an impact of a corrosive liquid or gas.

In an embodiment of the present disclosure, FIG. 1A to FIG. 1C represent a planar diagram and relate to a method of manufacturing a touch sensing device 200. With reference to FIG. 1A, the manufacturing method comprises providing a substrate 202. The substrate 202 comprises transparent material such as glass, quartz, or other elastic or inelastic high polymer transparent materials. In one embodiment, the substrate 202 is an opaque material.

In another embodiment of the present disclosure, the manufacturing method further comprises depositing a transparent conductive layer (not shown) such as indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium zinc magnesium oxide (InZnMgO), indium gallium aluminum oxide (InGaAlO), fluorine tin oxide (FTO), or antimony tin oxide (ATO) on the substrate 202. Further, the manufacturing method comprises forming a plurality of sensing electrode units by a method of patterning a transparent conductive layer though lithography and etching process. In an embodiment, the manufacturing of the sensing electrode units comprises forming a plurality of first sensing electrode units 204a and forming a plurality of second sensing electrode units 206a. The first sensing electrode units 204a are aligned along a first direction and connected to each other by a plurality of connecting parts 204b to form a plurality of first sensing electrode arrays 204, wherein each connecting part 204b is formed by the adjacent first sensing electrode units 204a, which have been extended (namely, the connecting parts 204b and the first sensing electrode units 204a are formed by the method of patterning the same transparent conductive layer). The second sensing electrode units 206a are aligned along a second direction, wherein the adjacent second sensing electrode units 206a in each second sensing electrode array 206 are spaced by a connecting part 204b of a first sensing electrode array 204. Furthermore, in the following manufacturing steps, a plurality of connecting lines 210 (shown in FIG. 1C and FIG. 2) are formed again to make the adjacent second sensing electrode units 206a be connected to each other through the connecting lines 210, so as to form a plurality of second sensing electrode arrays 206.

Further, the first sensing electrode arrays 204 and the second sensing electrode arrays 206 are formed on a non-touch surface of the substrate 202 (that is corresponding to the touch surface). In an embodiment, the first direction is paralleled to the vertical direction of FIG. 1C, and the second direction is paralleled to the horizontal direction of FIG. 1C, so that each of the first sensing electrode arrays 204 is perpendicular to each of the second sensing electrode arrays 206.

In another embodiment of the present disclosure, with reference to FIG. 1B, the manufacturing method comprises forming an insulating layer (not shown) such as silica layer, silicon nitride layer, polyimide or other transparent high polymer insulating layer or the combination thereof, on the substrate 202, for covering the second sensing electrode units 206a, the first sensing electrode arrays 204, and the second sensing electrode arrays 206. Once the insulating layer is formed, it is patterned by lithography and etching process to form an insulating pattern layer 208b on the substrate 202, which covers the sensing electrode units (namely, the first sensing electrode units 204a and the second sensing electrode units 206a) and has a plurality of openings 209 that are not corresponding to the sensing electrode units. In other words, the insulating bay 208a is located in the opening 209, and a gap "G" is defined between the inner-wall of the opening 209 and the sidewall of the insulating bay 208a, as shown in FIG. 1B and FIG. 2. Furthermore, the gap "G" is formed around the insulating bay 208a as a ring-shaped groove portion, as shown in the enlarged part of FIG. 1B.

In an embodiment of the present disclosure, a baking process is performed after the insulating layer has been formed to stabilize the sensing electrode units that lie beneath the insulating layer. In one embodiment, the foregoing baking process may be performed once the insulating layer has been patterned to form the insulating pattern layer 208b.

In an embodiment of the present disclosure, a plurality of insulating bays 208a are formed during the period of patterning the insulating layer for forming an insulating pattern layer 208b. Also, the insulating pattern layer 208b and the insulating bays 208a are formed by a method of patterning the same insulating layer. The insulating bays 208a are correspondingly disposed between each connecting part 204b and the connecting lines 210 that are formed (shown in FIG. 1C and FIG. 2), and may be stripe shaped and perpendicular to the connecting lines 210. In one embodiment, the insulating bays 208a may be rectangular, square or other applicable shapes.

Further, the insulating pattern layer 208b covers the first sensing electrode units 204a, the second sensing electrode units 206a, and part of the connecting parts 204b. Openings 209 thereof are corresponding to the insulating bays 208a, making the insulating pattern layer 208b surround each insulating bay 208a. The openings 209 that surround the insulating bays 208a reveal a part of the second sensing electrode units 206a and a part of the connecting parts 204b. In an embodiment of the present disclosure, the insulating bays 208a and the insulating pattern layer 208b form a protective structure 208.

Figure 3:
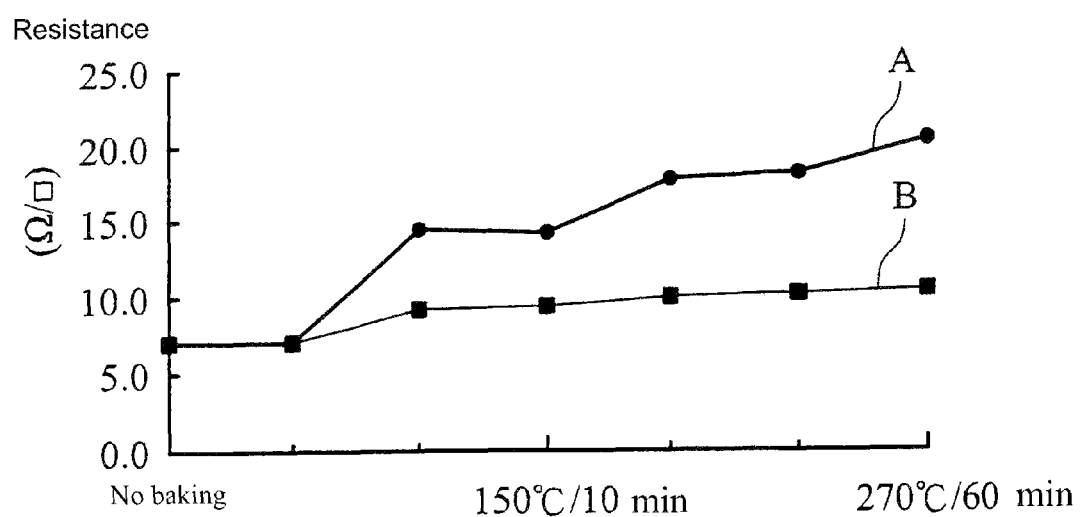
FIG. 3 is a relationship graph between sheet resistance of sensing electrode units and different baking conditions.

FIG. 3 illustrates a relationship graph between the sheet resistance of the sensing electrode units and different baking conditions. Curve A shows sheet resistance changes of the first sensing electrode units 204a and the second sensing electrode units 206a without the protective structure 208 under the different baking conditions, and curve B shows the sheet resistance changes of the first sensing electrode units 204a and the second sensing electrode units 206a with the protective structure 208 under the different baking conditions.

Further, with reference to FIG. 3 and FIG. 1B, as the protective structure 208 essentially covers the first sensing electrode units 204a, the second sensing electrode units 206a, and part of the connecting parts 204b to stabilize the first sensing electrode units 204a and the second sensing electrode units 206a, oxygen in the baking process can be efficiently isolated to avoid the first sensing electrode units 204a and the second sensing electrode units 206a being oxidized, thereby preventing the sheet resistance from increasing with the raising baking temperature (as shown by curve B). Contrarily, if the first sensing electrode units 204a and the second sensing electrode units 206a do not cover the protective structure 208, the first sensing electrode units 204a and the second sensing electrode units 206a would be oxidized to make the sheet resistance increase with the raising baking temperature (as shown by curve A).

Further, with reference to FIG. 1C, a conductive layer (not shown) is formed on the substrate 202 and on the protective structure 208, wherein material of the conductive layer can be metal such as a metal film composed of molybdenum, aluminum or molybdenum. Once the conductive layer is formed, it is patterned by lithography and etching process to form a connecting line 210 on each of the insulating bays 208a and extends to outboard of the insulating bays 208a, so as to connect to the adjacent second sensing electrode units 206a that have been exposed through the openings 209.

In an embodiment of the present disclosure, the step of patterning the conductive layer further comprises forming a plurality of pairs of connecting points 212 on each of the first sensing electrode arrays 204. Also, the connecting lines 210 and the connecting points 212 are formed by a method of patterning a same conductive layer. Each pair of second connecting points 212 are correspondingly disposed on the insulating bays 208a, which are located at two opposite sides of each connecting line 210, and extends to outboard of the insulating bays 208a and further extends in a gap between the insulating pattern layer 208b and the insulating bays 208a so as to electrically connect to the exposed connecting part 204b through the openings 209.

In an embodiment of the present disclosure, in the step of patterning, the conductive layer further comprises forming a plurality of first wires 214 to correspondingly connect to the first sensing electrode arrays 204, and forming a plurality of second wires 216 to correspondingly connect to the second sensing electrode arrays 206. Also, the connecting lines 210 and the connecting points 212 are formed by the method of patterning the same conductive layer; as well as the forming of the first and second wires 214 and 216.

In an embodiment of the present disclosure, after patterning the conductive layer, an insulating layer 218 may be overlaid on the protective structure 208 (namely, the insulating bays 208a and the insulating pattern layer 208b) and the first and second connecting points 210 and 212 such as silica layer, silicon nitrogen layer, polyimide or other transparent high polymer insulating layer or the combination thereof, for protecting the first sensing electrode arrays 204 and the second sensing electrode arrays 206 to avoid the oxidation or damages that are caused by the impact by corrosive liquid or gas.

According to the foregoing embodiments, the protective structure can prevent the sheet resistance of the sensing electrode unit from increasing so that the sensitivity of the touch sensing device may be enhanced or maintained. Furthermore, due to the second connecting points that are electrically contacted with the connecting part, resistance of the neck area (located at the junction of the first sensing electrode units and the connecting parts) is reduced and the signal attenuation may be efficiently avoided by each sensing electrode array. In addition, as the insulating bays and the insulating pattern layer in the protective structure are formed by the method of patterning the same insulating layer, and as the connecting points and the connecting lines are formed by the method of patterning the same conductive layer, there are no extra manufacturing process to manufacture the insulating pattern layer and the connecting points.

Although the present invention has been disclosed with reference to the above better embodiments, which is not intended to limit the present disclosure, it is apparent to one skilled in the art that modifications and substitutions to the described embodiments may be made without departing from the spirit of the present disclosure. Accordingly, the scope of the present disclosure is defined by the attached claims.

What is claimed is:

1. A touch sensing device, comprising:
   a plurality of sensing electrode units;
   an insulating pattern layer formed on the sensing electrode units and having a plurality of openings; and
   a plurality of insulating bays, wherein each of the insulating bays is located in the corresponding opening and a ring-shaped groove portion is formed around each of the insulating bays.

2. The touch sensing device according to claim 1, further comprising a substrate on which the sensing electrode units are disposed.

3. The touch sensing device according to claim 1, wherein the sensing electrode units comprise:
   a plurality of first sensing electrode units aligned along a first direction and connected to each other through a plurality of connecting parts to form a plurality of first sensing electrode arrays; and
   a plurality of second sensing electrode units aligned along a second direction and connected to each other through a plurality of connecting lines to form a plurality of second sensing electrode arrays.

4. The touch sensing device according to claim 3, wherein the first sensing electrode units, the connecting parts, and the second sensing electrode units are formed by same transparent conductive layer.

5. The touch sensing device according to claim 3, further comprising:
   a plurality of first wires correspondingly connected to the first sensing electrode arrays; and
   a plurality of second wires correspondingly connected to the second sensing electrode arrays.

6. The touch sensing device according to claim 5, wherein the connecting lines, the first wires, and the second wires are formed by same conductive layer.

7. The touch sensing device according to claim 3, wherein each of the insulating bays is disposed between the corresponding connecting part and the connecting line.

8. The touch sensing device according to claim 7, further comprising an insulating layer that covers the insulating pattern layer, insulating bays, and the connecting lines.

9. The touch sensing device according to claim 7, wherein the insulating pattern layer and the insulating bays are formed by same insulating layer.

10. The touch sensing device according to claim 7, wherein each of the first sensing electrode arrays further comprises a plurality of pairs of connecting points disposed on the insulating pattern layer and the insulating bays, and electrically connected to the connecting parts.

11. The touch sensing device according to claim 10, wherein the connecting points extend in the ring-shaped groove portion for electrically connecting to the connecting parts.

12. The touch sensing device according to claim 10, wherein the connecting lines and the connecting points are formed by same conductive layer.

13. A method for manufacturing a touch sensing device, comprising:
   forming a plurality of sensing electrode units;
   forming an insulating pattern layer and a plurality of insulating bays, wherein the insulating pattern layer is formed on the plurality of sensing electrode units and has a plurality of openings, wherein each of the insulating bays is located in the corresponding opening, and a ring-shaped groove portion is formed around each of the insulating bays.

14. The method for manufacturing the touch sensing device according to claim 13, further comprising forming the sensing electrode units on a substrate.

15. The method for manufacturing the touch sensing device according to claim 13, wherein the step of forming the sensing electrode units comprises:
   forming a plurality of first sensing electrode units aligned along a first direction and connected to each other through a plurality of connecting parts to form a plurality of first sensing electrode arrays; and
   forming a plurality of second sensing electrode units aligned along a second direction and connected to each other through a plurality of connecting lines to form a plurality of second sensing electrode arrays.

16. The method for manufacturing the touch sensing device according to claim 15, wherein the first sensing electrode units, the connecting parts, and the second electrode units are formed by a method of patterning same transparent conductive layer.

17. The method for manufacturing the touch sensing device according to claim 15, further comprising performing a baking process after the step of forming the insulating pattern layer and the insulating bays.

18. The method for manufacturing the touch sensing device according to claim 15, further comprising:
   forming a plurality of first wires to correspondingly connect to the first sensing electrode arrays, and
   forming a plurality of second wires to correspondingly connect to the second sensing electrode arrays.

19. The method for manufacturing the touch sensing device according to claim 18, wherein the connecting lines, the first wires, and the second wires are formed by a method of patterning same conductive layer.

20. The method for manufacturing the touch sensing device according to claim 15, further comprising:
   forming a plurality of pairs of connecting points, wherein each pair of the connecting points is disposed on the insulating pattern layer and the insulating bays, and is electrically connected to the connecting parts on each of the first sensing electrode arrays.

21. The method for manufacturing the touch sensing device according to claim 20, wherein the connecting points extend in the ring-shaped groove portion for electrically connecting to the connecting parts.

22. The method for manufacturing the touch sensing device according to claim 20, wherein the connecting lines and the connecting points are formed by a method of patterning same conductive layer.

23. The method for manufacturing the touch sensing device according to claim 15,
   wherein each of the insulating bays is disposed between the corresponding connecting part and the connecting line.

24. The method for manufacturing the touch sensing device according to claim 23, wherein the insulating pattern layer and the insulating bays are formed by same insulating layer.

25. The method for manufacturing the touch sensing device according to claim 23, further comprising forming an insulating layer on the insulating pattern layer, the insulating bays, and the connecting lines.

26. The method for manufacturing the touch sensing device according to claim 25, further comprising performing a baking process after the step of forming the insulating layer.

* * * * *